United States Patent
Tsai et al.

(10) Patent No.: US 11,446,727 B2
(45) Date of Patent: Sep. 20, 2022

(54) LOW-GLOSS METAL PLATE AND METHOD FOR FABRICATING THE SAME

(71) Applicant: Qisda Corporation, Taoyuan (TW)

(72) Inventors: Ying-Tsung Tsai, Taoyuan (TW); Cheng-Sheng Wu, Taoyuan (TW); Han-Kuang Ho, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 17/371,196

(22) Filed: Jul. 9, 2021

(65) Prior Publication Data

US 2022/0250135 A1   Aug. 11, 2022

(30) Foreign Application Priority Data

Feb. 8, 2021   (TW) .................. 110104667

(51) Int. Cl.
  *B21D 39/03*   (2006.01)
  *B21D 13/08*   (2006.01)
(52) U.S. Cl.
  CPC ........... *B21D 39/031* (2013.01); *B21D 13/08* (2013.01)
(58) Field of Classification Search
  CPC ............................. B21D 39/031; B21D 13/08
  See application file for complete search history.

(56) References Cited

FOREIGN PATENT DOCUMENTS

| JP | 2020066976 A | * | 4/2020 | ............ B21D 13/02 |
|---|---|---|---|---|
| TW | I656042 B | | 4/2019 | |
| TW | 201934360 A | * | 9/2019 | |
| TW | 202021794 A | | 6/2020 | |
| TW | M604805 U | * | 12/2020 | ............ B32B 21/00 |
| TW | M604805 U | | 12/2020 | |
| WO | WO-2020084819 A1 | * | 4/2020 | |

OTHER PUBLICATIONS

JP2020066976A; Norita et al.; Metallic Roof Material and Manufacturing Method Thereof; EPO English Machine Translation; pp. 1-10 (Year: 2022).*
Office action of counterpart application by Taiwan IP Office dated Jun. 29, 2021.

* cited by examiner

*Primary Examiner* — Bayan Salone

(57) ABSTRACT

A low-gloss metal plate includes a metal body and a plurality of metal pattern units. The metal body has a first surface and a second surface opposite to each other. The plurality of metal pattern units protrude from the first surface and are arranged to form a regular pattern. One of the plurality of metal pattern units has a top, a base and a sidewall. The base at least partially overlaps with the first surface. The sidewall connects the top with the base and forms an angle less than 60° with the base.

15 Claims, 6 Drawing Sheets

LOW-GLOSS METAL PLATE AND METHOD FOR FABRICATING THE SAME

This application claims the benefit of Taiwan application Serial No. 110104667, filed Feb. 8, 2021, the subject matter of which is incorporated herein by reference.

BACKGROUND OF THE DISCLOSURE

Field of the Disclosure

The disclosure relates in general to a metal plate and the manufacturing method thereof, and more particularly to a low-gloss metal plate and the method for fabricating the same.

Description of the Related Art

With the vigorous development of the optoelectronic industry, liquid crystal displays (LCD) are widely used in televisions (TV), monitors, notebooks (NB), personal digital assistants (PDA), mobile phones (cell phones) and other portable electronic devices. According to the new version EK1-ITB 2000:2020 (Bases for GS-mark tests of IT Equipment in Combination with Visual Display Units) A.2.9.18 announced by the Exchange of Experience Forum 1 (EK1) AG1 committee of the German GS verification authority ZLS, It requires that the gloss of all housings of the display must be less than 20 GU ($\leq$20 GU). However, the gloss of metal parts of most display housings on the market currently ranges from 15 GU to 35 GU, so they cannot meet the requirements of the new regulations.

At present, although manufactures have provided many ways, such as spray painting or pasting of polyester film (Mylar), wedging with plastic parts, or switching to use colored metal . . . etc, to make the metal parts of the display housing complying with the new version of EK1-ITB 2000:2020 standard. But the above solutions may lead to a substantial increase in manufacturing costs. How to deal with the new regulations with lower cost has become an important topic needed to be efforts and a concerned in the related field.

Therefore, there is a need to provide an advanced low-gloss metal plate and the method for fabricating the same to overcome the drawbacks of the prior art.

SUMMARY OF THE DISCLOSURE

One embodiment of the present disclosure is to provide a low-gloss metal plate, wherein the low-gloss metal plate includes a metal body and a plurality of metal pattern units. The metal body has a first surface and a second surface opposite to each other. The plurality of metal pattern units protrude from the first surface and are arranged to form a regular pattern. One of the plurality of metal pattern units has a top, a base and a sidewall. The base at least partially overlaps with the first surface. The sidewall connects the top with base and forms an angle less than 60° with the base.

Another embodiment of the present disclosure provides a method for fabricating a low-gloss metal plate, wherein the method includes steps as follows: Firstly, a metal body having a first surface and a second surface opposite to each other is provided. Then, at least one physical processing step is performed on the first surface to form a plurality of metal pattern units protruding from the first surface and arranged to form a regular pattern. One of the plurality of metal pattern units has a top, a base and a sidewall. The base at least partially overlaps with the first surface. The sidewall connects the top with the base and forms an angle less than 60° with the base.

According to the above embodiments, a low-gloss metal plate and the method for fabricating the same are disclosed. A plurality of metal pattern units that are regularly arranged are formed on an upper surface of a metal plate by at least one simple physical processing step, such as (but not limited to) rolling, stamping, malleating, milling or an arbitrary combination thereof. And the surface light reflectivity of the metal plate can be adjusted between 15% and 75% by adjusting the ratio of the height of the metal pattern units to the interval of two adjacent ones of the metal pattern units, by adjusting the angle formed by the sidewall and the base of the metal pattern units, and/or by adjusting the ratio of the top area of all the metal pattern units to the total area of the metal plate surface. Thereby, a more cost-effective solution for significantly reducing the gloss of the metal plate serving as a metal part of display housing can be provided without requiring additional materials or additional assembling manpower. By this approach, the gloss of the metal plate can be reduced to substantially less than 20 GU complying with the new version of EK1-ITB 2000:2020 standard.

BRIEF DESCRIPTION OF THE DRAWINGS

The above and other aspects of the disclosure will become better understood with regard to the following detailed description of the preferred but non-limiting embodiment(s). The following description is made with reference to the accompanying drawings.

DETAILED DESCRIPTION OF THE DISCLOSURE

The present disclosure provides a low-gloss metal plate and the method for fabricating the same to control the surface light reflectivity of metal part and reduce the gloss thereof by performing at least one simple processing step, thereby providing a more cost-effective solution to achieve the new version of EK1-ITB 2000:2020 standard. The above and other aspects of the disclosure will become better understood by the following detailed description of the preferred but non-limiting embodiment(s). The following description is made with reference to the accompanying drawings:

Several embodiments of the present disclosure are disclosed below with reference to accompanying drawings. However, the structure and contents disclosed in the embodiments are for exemplary and explanatory purposes only, and the scope of protection of the present disclosure is not limited to the embodiments. It should be noted that the present disclosure does not illustrate all possible embodiments, and anyone skilled in the technology field of the disclosure will be able to make suitable modifications or changes based on the specification disclosed below to meet actual needs without breaching the spirit of the disclosure. The present disclosure is applicable to other implementations not disclosed in the specification.

Figure 1A:
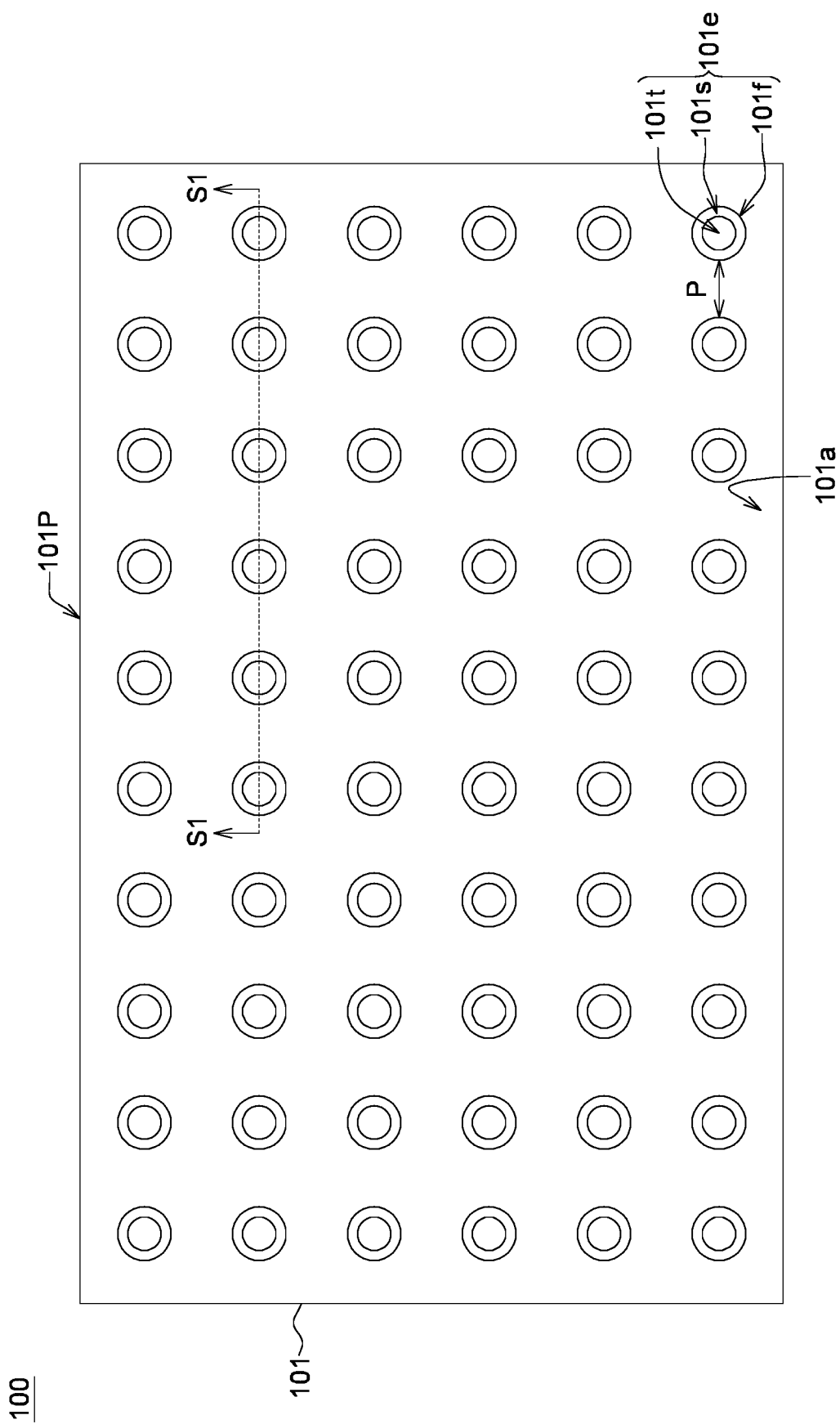
FIG. 1A is a top view illustrating a low-gloss metal plate according to one embodiment of the present disclosure.
Figure 1B:
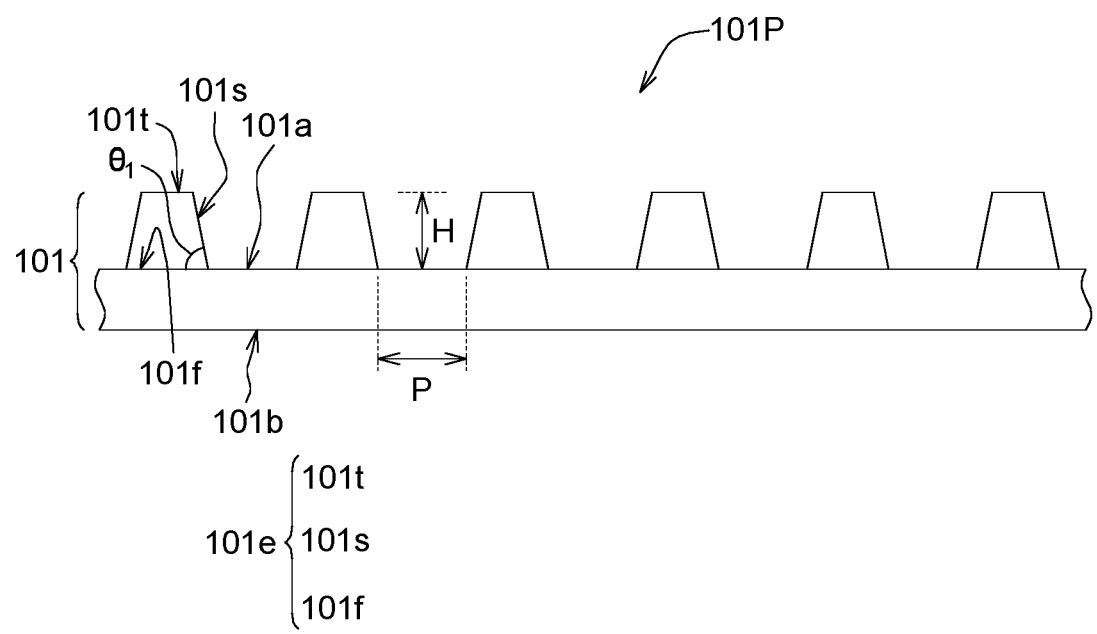
FIG. 1B is a cross-sectional view illustrating the low-gloss metal plate taken along the cutting line S1 as depicted in FIG. 1A.

FIG. 1A is a top view illustrating a low-gloss metal plate 100 according to one embodiment of the present disclosure; and FIG. 1B is a cross-sectional view illustrating the low-gloss metal plate 100 taken along the cutting line S1 as depicted in FIG. 1A.

The low-gloss metal plate 100 includes a metal body 101 and a plurality of metal pattern units 101e. The metal body 101 has a first surface 101a and a second surface 101b opposite to each other. The plurality of metal pattern units 101e protrude from the first surface 101a and are arranged to form a regular pattern 101P.

In some embodiments of the present disclosure, each of the metal pattern units 101e can be a metal conical column with a narrow top and a wide bottom, protruding from the first surface 101a and having a circular top-view profile. In detail, each of the metal pattern units 101e has a circular top 101t, a circular base 101f and a sidewall 101s with a narrower upper portion and a wider lower portion. Wherein, the base 101f overlaps with a part of the first surface 101a; the sidewall 101s connects the top 101t and the base 101f; and the sidewall 101s and the base 101f form an angle θ1 that is less than or equal to 60°.

In the present embodiment, as shown in FIG. 1A, the top-view profiles of the plurality of metal conical columns (the metal pattern units 101e) can be arranged to form a matrix array pattern configured by regularly arranged *circulars*. The ratio of the width of the base 101f to that of the top 101t of the metal pattern units 101e is substantially between 2 to 15. And the ratio of the pattern area formed by the sum of the areas of the tops 101t of the plurality of metal pattern units 101e to the total area of the first surface 101a (pattern area/total area of the first surface 101a) is substantially between 15% to 85%.

As shown in FIG. 1B, the ratio (H/P) of the height H of the metal pattern units 101e to the interval P between the two adjacent tops 101t of metal pattern units 101e is substantially between 0.3 and 0.5. The angle 81 formed by the sidewall 101s and the base 101f may be 30°.

With the above-mentioned arrangement of the matrix array pattern, the top 101t of the plurality of metal pattern units 101e, the sidewall 101s of the plurality of metal pattern units 101e and the remaining portion of the first surface 101a without counting the portions overlapping with the base 101f of the plurality of metal pattern units 101e can jointly form a concave-convex surface having a light reflectivity between 15% to 85%. The light reflectivity of the concave-convex surface preferably is between 20% and 75%.

In some embodiments of the present disclosure, by adjusting the ratio (H/P) of the height H to the interval P of the metal pattern units 101e, by adjusting the angle 81 formed by the sidewall 101s and the base 101f of the metal pattern units 101e, and/or by adjusting the ratio (thereinafter referred to as the pattern area ratio (%)) of the pattern area formed by the sum of the areas of the top 101t of the plurality of metal pattern units 101e to the total area of the first surface 101a (including the portions overlapping with the base 101f of the plurality of metal pattern units 101e), the light reflectivity of the concave-convex surface of the low-gloss metal plate 100 can be manipulated. For example, the gloss of the metal plate 100 can be reduced to substantially less than 20 GU complying with the new version of EK1-ITB 2000:2020 standard.

Several embodiments of the low-gloss metal plate 100 with different parameter configurations are listed in the following Table:

| | Embodiment | | | | | | |
| --- | --- | --- | --- | --- | --- | --- | --- |
| | 1 | 2 | 3 | 4 | 5 | 6 | 7 |
| width of the base (μm) | 0.5 | 0.5 | 0.5 | 0.687 | 0.355 | 0.9 | 1.129 |
| width of the top (μm) | 0.1 | 0.1 | 0.1 | 0.1 | 0.1 | 0.1 | 0.1 |
| height H (μm) | 0.35 | 0.35 | 0.35 | 0.35 | 0.35 | 0.35 | 0.45 |
| Angle θ1 | 60° | 60° | 60° | 50° | 70° | 41° | 41° |
| interval P (μm) | 0.5 | 0.3 | 0.1 | 0.5 | 0.5 | 0.1 | 0.1 |
| Pattern area ratio (%) | 25.0 | 39.1 | 69.4 | 33.5 | 17.2 | 81.0 | 84.4 |
| Ratio of remaining area (%) | 75.0 | 60.9 | 30.6 | 66.5 | 82.8 | 19.0 | 15.6 |
| Received energy (%) | 75.1 | 61.0 | 30.5 | 52.9 | 87.4 | 19.0 | 15.6 |
| Light reflectivity (%) | 24.9 | 39.0 | 69.5 | 47.1 | 12.6 | 81 | 84.4 |

Wherein, the ratio of remaining area (%) is equal to 100(%) minus the pattern area ratio (%). The light reflectivity (%) is equal to 100(%) minus the received energy (%).

The method for fabricating the low-gloss metal plate 100 includes steps as follows: Firstly, a metal body 101 having a first surface 101a and a second surface 101b opposite to each other is provided. Then, a physical processing step is performed on the first surface to form a plurality of metal pattern units 101e protruding from the first surface 101a, wherein the plurality of metal pattern units 101e are arranged to form a regular pattern 101P.

In some embodiments of the present disclosure, the physical processing step can be a malleating or rolling step by which the metal body 101 is passed through a pair of rolling rollers to shape the first surface 101a. In one embodiment, the physical processing step can be a stamping step in which the metal body 101 is punched by means of stamping equipment. In one embodiment, the physical processing step can be a step of removing a part of the metal material on the surface of the metal body 101 by mechanical force (such as, cutting or rubbing) or plasma bombardment. In one embodiment, the physical processing step can be an arbitrary combination of the aforementioned steps.

Wherein, one of the plurality of metal pattern units 101e has a top 101t, a base 101f, and a sidewall 101s. The base 101f overlaps a part of the first surface 101a. The sidewall 101s connects the top 101t and the base 101f. The sidewall 101s and the base 101f form an angle 81 less than 60°.

Figure 2:
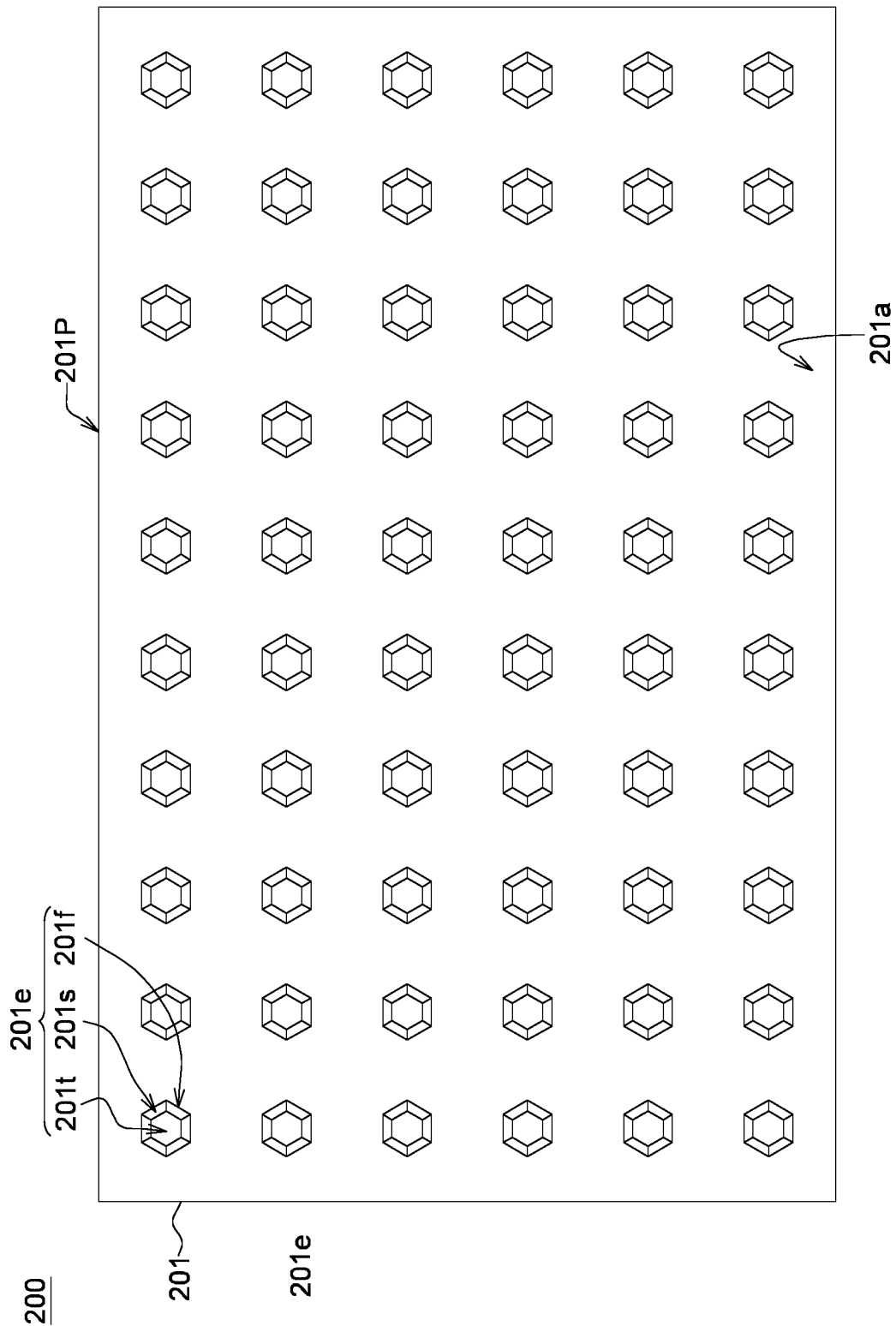
FIG. 2 is a top view illustrating a low-gloss metal plate according to another embodiment of the present disclosure.

However, the shape and pattern of the metal pattern units formed by the aforementioned physical processing steps are not limited to this regard. In some embodiments, the metal pattern units 201e can be (but not limited to) a polygonal pyramid structure (not shown), and the top 201t has a polygonal top-view profile. FIG. 2 is a top view illustrating a low-gloss metal plate 200 according to another embodiment of the present disclosure.

As shown in FIG. 2, the low-gloss metal plate 200 includes a regular pattern 201P composed of a plurality of metal pattern units 201e. Wherein, each of the metal pattern units 201e can be a hexagonal cone protruding from the first surface 201a of the metal body 201. Each of the metal pattern units 201e has a hexagonal top 201t, a hexagonal base 201f, and six trapezoidal sidewalls 201s. Wherein, the base 201f at least partially overlaps with the first surface 201a; the sidewall 201s connects the top 201t with the base 201f; and the angle (not shown) formed by the sidewall 201s and the base 201f is 45°.

Figure 3A:
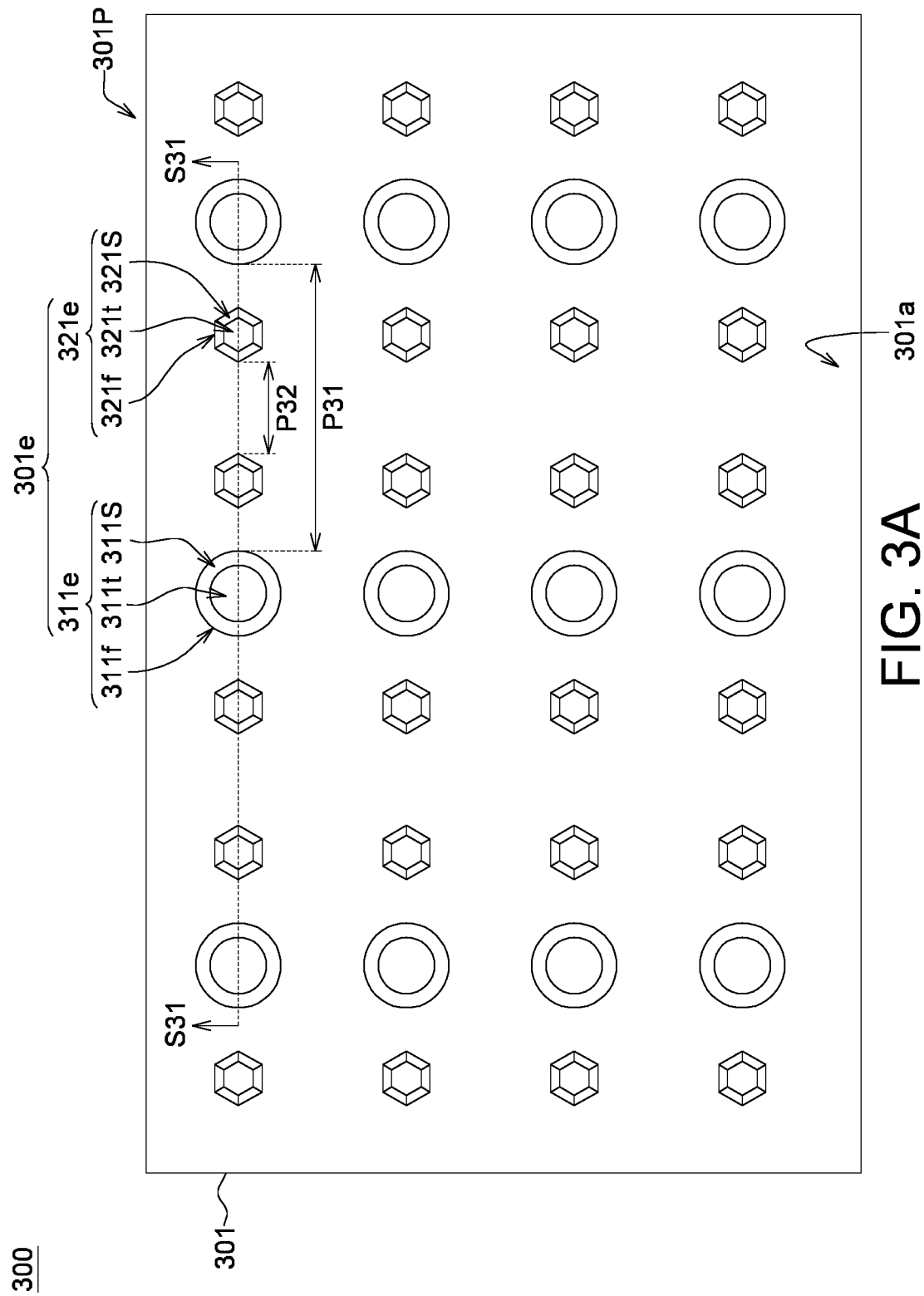
FIG. 3A is a top view illustrating a low-gloss metal plate according to yet another embodiment of the present disclosure.
Figure 3B:
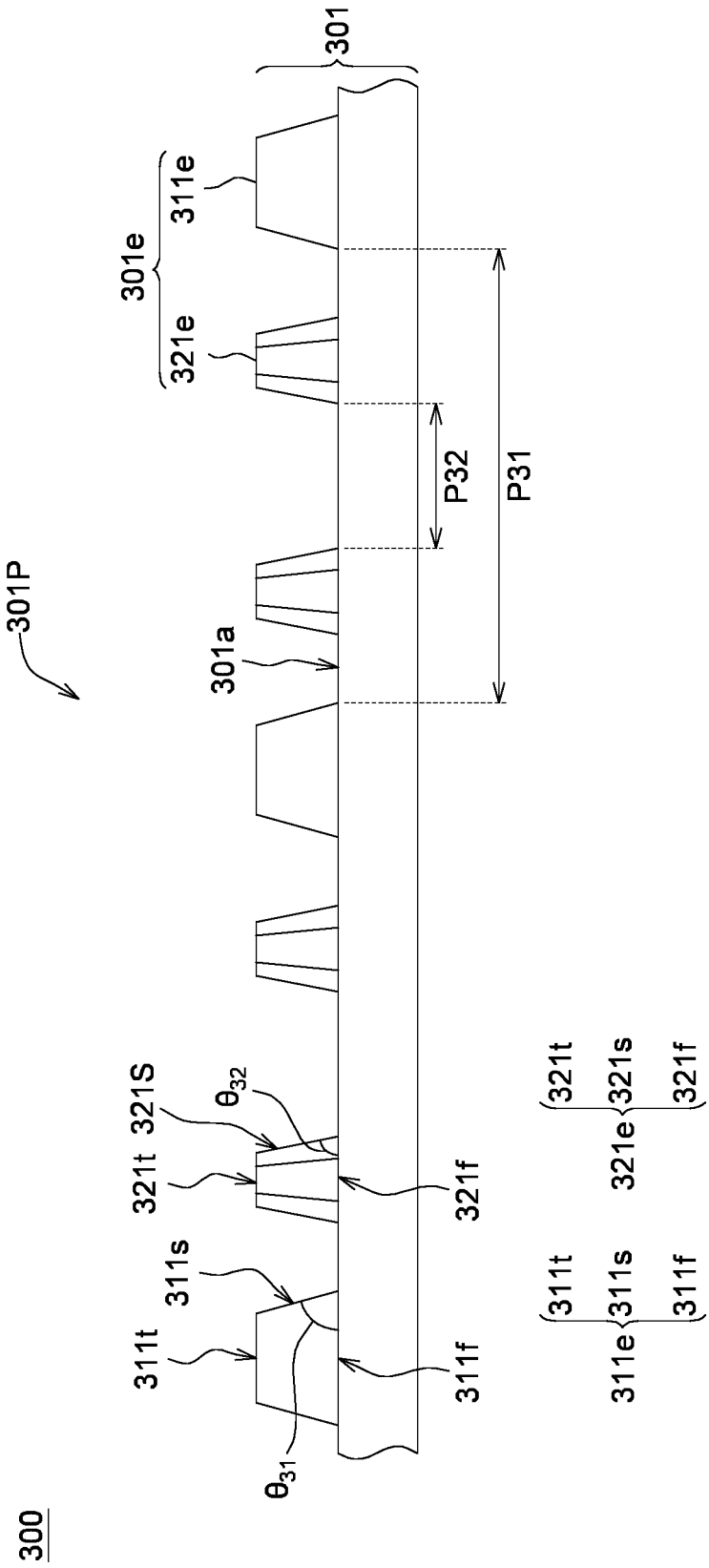
FIG. 3B is a cross-sectional view illustrating the low-gloss metal plate taken along the cutting line S3 as depicted in FIG. 3A.

In addition, the plurality of metal pattern units 301e formed by the aforementioned physical processing steps may have at least two metal pattern subunits with different shapes. For example, FIG. 3A is a top view illustrating a low-gloss metal plate 300 according to yet another embodiment of the present disclosure; FIG. 3B is a cross-sectional view illustrating the low-gloss metal plate 300 taken along the cutting line S3 as depicted in FIG. 3A. In the present embodiment, the plurality of metal pattern units 301e may include a plurality of first metal pattern subunits 311e and a plurality of second metal pattern subunits 321e.

The size and shape of the first metal pattern sub-unit 311e and the second metal pattern sub-unit 321e are different. For example, in the present embodiment, each of the first metal pattern subunits 311e may be a metal conical column protruding from the first surface 301a with a narrow top and a wide bottom. Each of the second metal pattern subunits 321e may be a hexagonal cone protruding from the first surface 301a. The size of the first metal pattern subunits 311e is larger than the size of the second metal pattern subunits 321e.

In detail, each of the first metal pattern subunits 311e has a circular top 311t, a circular base 311f, and a sidewall 311s with a narrow top and a wide bottom. Wherein, the base 311f overlaps a part of the first surface 301a; the sidewall 311s connects the top 311t with the base 311f; and the sidewall 311s and the base portion 311f form an angle 831 less than or equal to 60°.

Each of the second metal pattern subunits 321e has a hexagonal top 321t, a hexagonal base 321f, and six trapezoidal sidewalls 321s. Wherein, the base 321f overlaps a part of the first surface 321a; the sidewalls 321s connect the top 321t with the base 321f; and the angles 832 formed by the sidewalls 321s and the base 321f are 60°.

In the present embodiment, the minimum interval P31 between any two ones of the first metal pattern subunits 311e is greater than the minimum interval P32 between any two ones of the second metal pattern subunits 321e. In addition, the plurality of first metal pattern subunits 311e and the plurality of second metal pattern subunits 321e can be arranged alternately to form a regular pattern 301P composed of two different metal pattern subunits and arranged in accordance with the same rules.

In some other embodiments of the present disclosure, the plurality of first metal pattern subunits 311e and the plurality of second metal pattern subunits 321e are not arranged in a staggered manner. Instead, a part of the first metal pattern sub-units 311e and a part of the second metal pattern sub-units 321e are arranged separately from each other, these two different metal pattern sub-units that are arranged separately respectively form two sub-patterns (not shown), and the two sub-patterns (not shown) are used to form a regular pattern (not shown) composed of these two different metal pattern sub-units.

Figure 4:
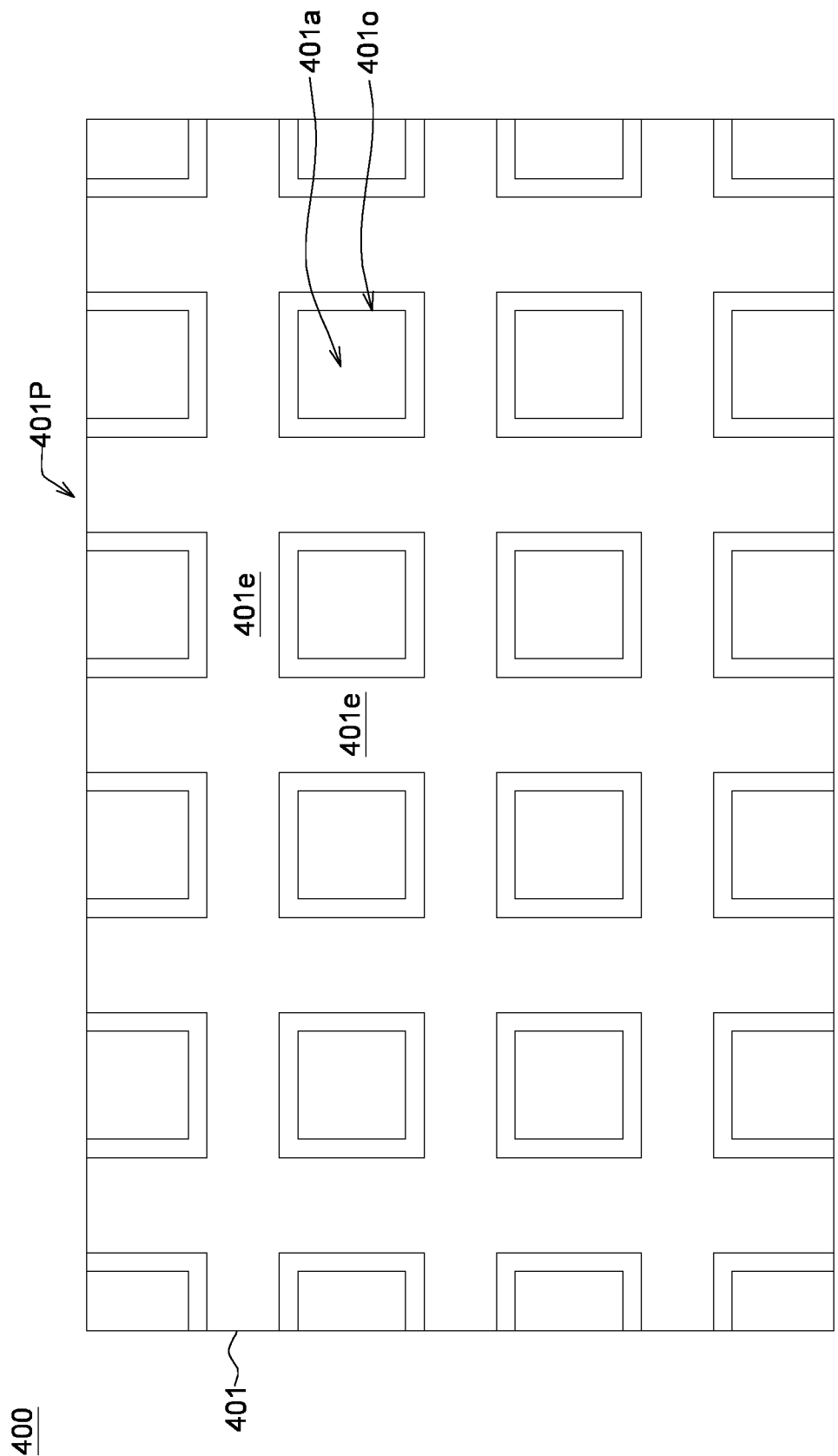
FIG. 4 is a top view illustrating a low-gloss metal plate according to a further embodiment of the present disclosure.

In addition, in some embodiments, a plurality of metal pattern units 401e formed by the aforementioned physical processing steps can be crossed or connected to each other to form a regular pattern 401P with a grid structure. For example, FIG. 4 is a top view illustrating a low-gloss metal plate 400 according to a further embodiment of the present disclosure. In the present embodiment, the regular pattern 401P of the low-gloss metal plate 400 is composed of a plurality of elongated trapezoidal columnar metal pattern units 401e protruding on the first surface 401a of the metal body 401 and perpendicularly crossing with each other to form a plurality of openings 401o, from which a part of the first surface 401a of the metal body 401to can be exposed.

According to the above embodiments, a low-gloss metal plate and the method for fabricating the same are disclosed. A plurality of metal pattern units that are regularly arranged are formed on an upper surface of a metal plate by at least one physical processing step, such as (but not limited to) rolling, stamping, malleating, milling or an arbitrary combination thereof. And the surface light reflectivity of the metal plate can be adjusted between 15% and 75% by adjusting the ratio of the height of the metal pattern units to the interval of two adjacent ones of the metal pattern units, by adjusting the angle formed by the sidewall and the base of the metal pattern units, and/or by adjusting the ratio of the top area of all the metal pattern units to the total area of the metal plate surface. Thereby, a more cost-effective solution for significantly reducing the gloss of the metal plate serving as a metal part of display housing can be provided without requiring additional materials or additional assembling manpower. By this approach, the gloss of the metal plate can be reduced to substantially less than 20 GU complying with the new version of EK1-ITB 2000:2020 standard.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A low-gloss metal plate serving as a metal part of a display housing, comprising:
    a metal body, having a first surface and a second surface opposite to each other; and
    a plurality of metal pattern units, protruding from the first surface and arranged to form a regular pattern;
    wherein one of the plurality of metal pattern units has a top, a base and a sidewall; the base at least partially overlaps with the first surface; the sidewall connects the top with the base and forms an angle less than 60° with the base; wherein the low-gloss metal plate has a gloss substantially less than 20 GU.

2. The low-gloss metal plate according to claim 1, wherein a ratio of a pattern area formed by a sum of top areas of the plurality of metal pattern units to a total area of the first surface is between 15% and 85%; and the tops of the plurality of metal pattern units, the sidewalls of the plurality of metal pattern units and a remaining portion of the first surface without counting portions overlapping with the bases of the plurality of metal pattern units jointly have a light reflectivity between 15% and 75%.

3. The low-gloss metal plate according to claim 1, wherein a ratio of a width of the base to that of the top is substantially between 2 to 15.

4. The low-gloss metal plate according to claim 1, wherein the angle is 30°.

5. The low-gloss metal plate according to claim 1, wherein a ratio of a height of the plurality of metal pattern units to an interval between two adjacent tops of the plurality of metal pattern units is substantially between 0.3 and 0.5.

6. The low-gloss metal plate according to claim 1, wherein the plurality of metal pattern units have a plurality of first metal pattern subunits and a plurality of second metal pattern subunits with different shapes.

7. The low-gloss metal plate according to claim 1, wherein the top has a polygonal top-view profile.

8. A method for fabricating a low-gloss metal plate serving as a metal part of a display housing, comprising:
providing a metal body having a first surface and a second surface opposite to each other; and
performing a physical processing step on the first surface to form a plurality of metal pattern units protruding from the first surface and arranged to form a regular pattern;
wherein one of the plurality of metal pattern units has a top, a base and a sidewall; the base at least partially overlaps with the first surface; the sidewall connects the top with the base and forms an angle less than 60° with the base; wherein the low-gloss metal plate has a gloss substantially less than 20 GU.

9. The method according to claim 8, wherein the physical processing step is selected from a group consisting of a rolling step, a stamping step, a malleating step, milling and arbitrary combinations thereof.

10. The method according to claim 8, wherein a ratio of a pattern area formed by a sum of top areas of the plurality of metal pattern units to a total area of the first surface is between 15% and 85%; and the tops of the plurality of metal pattern units, the sidewalls of the plurality of metal pattern units and a remaining portion of the first surface without counting portions overlapping with the bases of the plurality of metal pattern units jointly have a light reflectivity between 15% and 75%.

11. The method according to claim 8, wherein a ratio of a width of the base to that of the top is substantially between 2 to 15.

12. The method according to claim 8, wherein the angle is 30°.

13. The method according to claim 8, wherein a ratio of a height of the plurality of metal pattern units to an interval between two adjacent tops of the plurality of metal pattern units is substantially between 0.3 and 0.5.

14. The method according to claim 8, wherein the plurality of metal pattern units have a plurality of first metal pattern subunits and a plurality of second metal pattern subunits with different shapes.

15. The method according to claim 8, wherein the top has a polygonal top-view profile.

* * * * *